(12) United States Patent  
genannt Berghegger

(10) Patent No.: US 7,295,450 B2  
(45) Date of Patent: Nov. 13, 2007

(54) PRIMARY-CONTROLLED SMPS WITH ADJUSTABLE SWITCHING FREQUENCY FOR OUTPUT VOLTAGE AND CURRENT CONTROL

(75) Inventor: Ralf Schröder genannt Berghegger, Glandorf (DE)

(73) Assignee: Friwo Mobile Power GmbH, Ostbevern (DE)

( * ) Notice: Subject to any disclaimer, the term of this patent is extended or adjusted under 35 U.S.C. 154(b) by 195 days.

(21) Appl. No.: 11/099,228

(22) Filed: Apr. 5, 2005

(65) Prior Publication Data

US 2005/0276083 A1    Dec. 15, 2005

(30) Foreign Application Priority Data

Apr. 6, 2004   (DE) .................. 10 2004 016 927

(51) Int. Cl.
*H02M 3/335* (2006.01)
(52) U.S. Cl. .............................. 363/21.08; 363/21.16; 363/97
(58) Field of Classification Search ............. 363/21.08, 363/21.16, 97
See application file for complete search history.

(56) References Cited

U.S. PATENT DOCUMENTS

| | | | |
|---|---|---|---|
| 2,585,005 A | | 2/1952 | Godshalk et al. |
| 3,742,371 A | | 6/1973 | Seibt et al. |
| 4,209,736 A | | 6/1980 | Reidenbach |
| 4,400,767 A | * | 8/1983 | Fenter ................... 363/21.15 |
| 4,754,386 A | * | 6/1988 | De Weerd ............... 363/21.08 |
| 4,772,995 A | | 9/1988 | Gautherin et al. |
| 4,858,052 A | * | 8/1989 | McDonnal ................. 361/18 |
| 4,975,823 A | * | 12/1990 | Rilly et al. .............. 363/21.16 |

(Continued)

FOREIGN PATENT DOCUMENTS

DE    21 67 212 C2    9/1971

(Continued)

OTHER PUBLICATIONS

Andreycak, Bill, "Elegantly Simple Off-Line Bias Supply for Very Low Power Applicaitons," Unitrode Corporation, Applicaiton Note U-149A, 1994, Seiten 1-11.

(Continued)

*Primary Examiner*—Jeffrey Sterrett
(74) *Attorney, Agent, or Firm*—Michael Best & Friedrich LLP

(57) ABSTRACT

The present invention relates to a method for controlling the output voltage of a primary-controlled switched-mode power supply unit having a primary-side switch and a transformer with an auxiliary winding in which an auxiliary voltage which images the output voltage is induced after the primary-side switch is opened. The voltage induced in the auxiliary winding is fed to a control circuit as the control variable. The present invention also relates to a control circuit for performing such a control method and to an associated switched-mode power supply unit. To adjust the output voltage and the output current in the simplest and most economical way while minimizing the cost of the components needed, the switching frequency of the primary-side switch is so adjusted in dependence on the auxiliary voltage in the present invention that the output voltage and the output current of the switched-mode power supply unit adopt values in accordance with a predetermined output characteristic. This may be a linear output characteristic.

13 Claims, 6 Drawing Sheets

U.S. PATENT DOCUMENTS

| | | | |
|---|---|---|---|
| 5,430,405 A | 7/1995 | Cohen | |
| 5,438,499 A | 8/1995 | Bonte et al. | |
| 5,528,483 A * | 6/1996 | Mohandes | 363/21.07 |
| 5,745,358 A * | 4/1998 | Faulk | 363/95 |
| 5,936,852 A * | 8/1999 | Weinmeier et al. | 363/21.15 |
| 6,340,879 B1 | 1/2002 | Blacker | |
| 6,693,413 B1 | 2/2004 | Lanni | |
| 6,728,117 B2 * | 4/2004 | Schemmann et al. | 363/21.12 |
| 6,963,496 B2 * | 11/2005 | Bimbaud | 363/21.16 |

FOREIGN PATENT DOCUMENTS

| | | |
|---|---|---|
| DE | 197 11 771 | 10/1998 |
| DE | 103 10 361 | 9/2004 |
| EP | 0 522 691 | 1/1993 |
| EP | 1 146 630 | 10/2001 |
| EP | 1 499 005 | 1/2005 |
| GB | 1349870 | 4/1974 |
| JP | 52-119028 | 9/1977 |
| JP | 2000-323975 | 11/2000 |
| JP | 2003-61352 | 2/2003 |
| WO | WO95/09476 | 4/1995 |
| WO | WO 02/37641 | 5/2002 |
| WO | WO 02/45248 | 6/2002 |
| WO | 03/075443 | 9/2003 |

OTHER PUBLICATIONS

Japan Patent Office Notice of Reason for Rejection for Japanese Patent Application No. 2005-108464, mailed to Applicant Jul. 24, 2007.

* cited by examiner

PRIMARY-CONTROLLED SMPS WITH ADJUSTABLE SWITCHING FREQUENCY FOR OUTPUT VOLTAGE AND CURRENT CONTROL

BACKGROUND OF THE INVENTION

1. Field of the Invention

The present invention relates to a method for controlling the output voltage of a primary-controlled switched-mode power supply unit having a primary-side switch and a transformer with an auxiliary winding in which an auxiliary voltage which images the output voltage is induced after the primary-side switch is opened. The voltage induced in the auxiliary winding is fed to a control circuit as the control variable. The present invention also relates to a control circuit for performing such a control method and to an associated switched-mode power supply unit.

2. Description of the Related Art

Known switched-mode power supply units normally employ a power transistor as the switch to feed a pulsed current to a network of inductive and capacitive energy storage elements which transform the switched current pulses into a controlled dc voltage. Switched-mode power supply units can supply output voltages which are greater than, less than or of opposite polarity to the uncontrolled input voltage, depending on the operating mode of the switched-mode power supply unit. Switched-mode power supply units are often employed in power supply circuits. Here it is especially desirable that such a switched-mode power supply unit should accept input voltages in the range from 85 V ac to 270 V ac and can therefore operate with different mains power supplies everywhere in the world without modifications or switches.

The output voltage of such a switched-mode power supply unit is usually controlled by means of a feedback signal which images the output voltage. This feedback signal is used to control the operating cycle of the switching power transistor. There are various ways of providing a suitable feedback signal. For example, an auxiliary winding can be provided which, during the switch-off time, generates a feedback signal which delivers an image of the output voltage.

Such switched-mode power supply units with auxiliary windings are described e.g. in the German patent application DE 103 10 361, the European patent application EP 03 016 065.9, the U.S. Pat. No. 5,438,499 and the German published patent application DE 197 11 771 A1. Here the signal generated in the auxiliary winding is fed to a feedback circuit which supplies the control signal to the control circuit.

In a switched-mode power supply unit according to the flyback converter principle, wherein the transferred energy per pulse is the same and the duration of the pauses between the pulses is adjustable, as is demonstrated in EP 03 016 065.9, the output voltage can be very well imaged and controlled with the primary auxiliary voltage.

With the known switched-mode power supply units there is, however, the problem that the output current can only be registered in a very complicated way. For example, as is shown in DE 103 10 361, the current flow time of the secondary winding of the converter can be determined. Alternatively, an optocoupler can be used, as shown e.g. in the European patent application EP 1 146 630 A2.

SUMMARY OF THE INVENTION

It is the object of the present invention to adjust the output voltage and the output current in the simplest and most economical way while minimizing the cost of the components needed.

According to a first aspect of the present invention, a method for controlling the output voltage of a primary-controlled switched-mode power supply unit is provided, said power supply unit having a primary-side switch and a transformer with an auxiliary winding in which an auxiliary voltage which images the output voltage is induced after the primary-side switch is opened. The switching frequency of the primary-side switch is adjusted in dependence on the auxiliary voltage in a way that the output voltage and the output current of the switched-mode power supply unit take values which comply with a predetermined output characteristic.

According to a further aspect of the present invention, a control circuit for controlling the output voltage of a primary-controlled switched-mode power supply unit is provided, said switched-mode power supply unit having a primary-side switch and a transformer with an auxiliary winding in which an auxiliary voltage is induced after the opening of the primary-side switch. Said control circuit is designed for adjusting the switching frequency of the primary-side switch in linear dependence on the auxiliary voltage, a constant factor of this linear dependence being chosen in a way that the output current of the switched-mode power supply unit adopts a predetermined value.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention is illustrated in the accompanying drawings, wherein.

DETAILED DESCRIPTION OF THE INVENTION

The illustrated embodiments of the present invention will be described with reference to the figure drawings wherein like elements and structures are indicated by like reference numbers.

Figure 1:
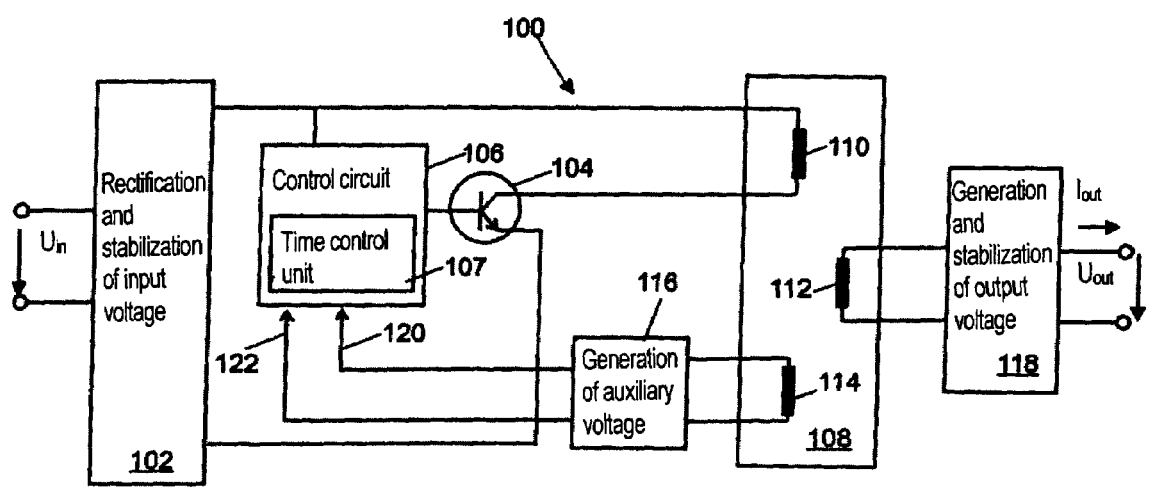
FIG. 1 shows a schematic diagram of a primary-controlled switched-mode power supply unit with a control circuit according to the present invention.

Referring now to the Figures and in particular to FIG. 1, a schematic diagram of a switched-mode power supply unit with a control circuit 100 according to the present invention is shown.

The present invention is based on the idea that, for a known output voltage, the power needed for a certain output current can be calculated according to the following equation (1):

$$P = \frac{U_{out} \cdot I_{out}}{\eta} \quad (1)$$

where P is the output power, $U_{out}$ the output voltage, $I_{out}$ the output current and $\eta$ the efficiency. Further, the switching frequency f to be set is given by the relationship in the following equation (2):

$$f = P/W \quad (2)$$

with $$W = \frac{L_{prim} \cdot I_{prim,max}^2}{2},$$

where $L_{prim}$ denotes the primary-side inductance and $I_{prim,max}$ the maximum primary-side current.

If equation (1) is substituted in equation (2) the result is:

$$f = U_{out} \cdot I_{out} \cdot \underbrace{\frac{1}{\eta \cdot W}}_{=const.} \quad (3)$$

This means, however, that for constant and known efficiency $\eta$ the product of the output voltage $U_{out}$ and the output current $I_{out}$ depends linearly on the frequency f. As a result, for a given output current $I_{out}$, the required switching frequency f can be determined directly from the output voltage $U_{out}$ fed back via the auxiliary voltage.

The advantage of this solution according to the present invention is that there is no need for elaborate multi-component measuring methods to determine the output current.

The ac voltage $V_{mains}$ is applied to the input of the switched-mode power supply unit. In Europe the mains voltage varies between 180 and 264 V ac, in America between 90 and 130 V ac. In the block 102 the input voltage is rectified and stabilized. In addition, it is ensured that any interference signals generated in the switched-mode power supply unit do not penetrate into the mains power supply. The primary-side winding 110 of the isolating transformer 108 and the primary-side switch 104, which is a power transistor here, form a series circuit which is connected to the rectified input voltage. The primary-side switch 104 interrupts the current flowing through the primary-side winding 110 in accordance with the control signal of the control circuit 106.

The switching pulses supplied to the control input of the primary-side switch 104 by the control circuit 106 are controlled by the block 116, in which the control variable is generated with the aid of an auxiliary winding 114 of the transformer 108. The two signal paths 120 and 122 denote two important functions of the block 116. Firstly, the signal 120 "pumps" the control circuit 106 to maintain the free oscillation. Secondly, the signal path 122 controls the control circuit 106 in such a way that changes in the switching cycle effect the desired changes in the electric power supplied to the transformer 108. In the switched-mode power supply unit according to the present invention the control circuit 106 includes a time control unit 107 which ensures that the length of the pauses (or switch-off intervals) during which the primary-side switch 104 is open matches the power required. The energy delivered to the transformer 108 during each switch-on phase of the primary-side switch always remains the same.

As can be seen from FIG. 1, the secondary-side winding 112 of the transformer 108 is connected to a block 118, which generates and if necessary stabilizes the secondary-side voltage $U_{out}$.

The control circuit 106 controls the primary-side switch 104 in such a way that it alternates between the conducting and non-conducting state. Due to the voltage supplied by the block 102 a current flows in the primary-side winding 110 whenever the primary-side switch 104 is in the conducting state. A change in the current stores energy in the magnetic field of the transformer 108. When the primary-side switch 104 blocks, the energy stored in the magnetic field discharges mainly through the secondary winding 112 and into the block 118, which generates and stabilizes the secondary voltage. However, the secondary winding 114 discharges a small part of the energy into the block 116. This generates an auxiliary voltage as the control variable. The energy discharges periodically, but an essentially rectified voltage can be generated as the auxiliary voltage by rectification and filtering. Since the magnetic coupling between the various windings of the transformer 108 is constant and does not depend on the value of the current or the voltage, the value of the auxiliary voltage is proportional to the value of the secondary voltage and thus to the value of the output voltage.

With the aid of the time control unit 107 the switch-off interval of the primary-side switch 104 can be so adjusted that the energy fed into the transformer depends on the output voltage. The transferred power is thus adjusted to a value which results in the desired value for the output voltage $U_{out}$.

According to the present invention the value of the voltage $U_{out}$ is thereby so adjusted that a constant and predetermined value for the output current $I_{out}$ results.

Figure 2:
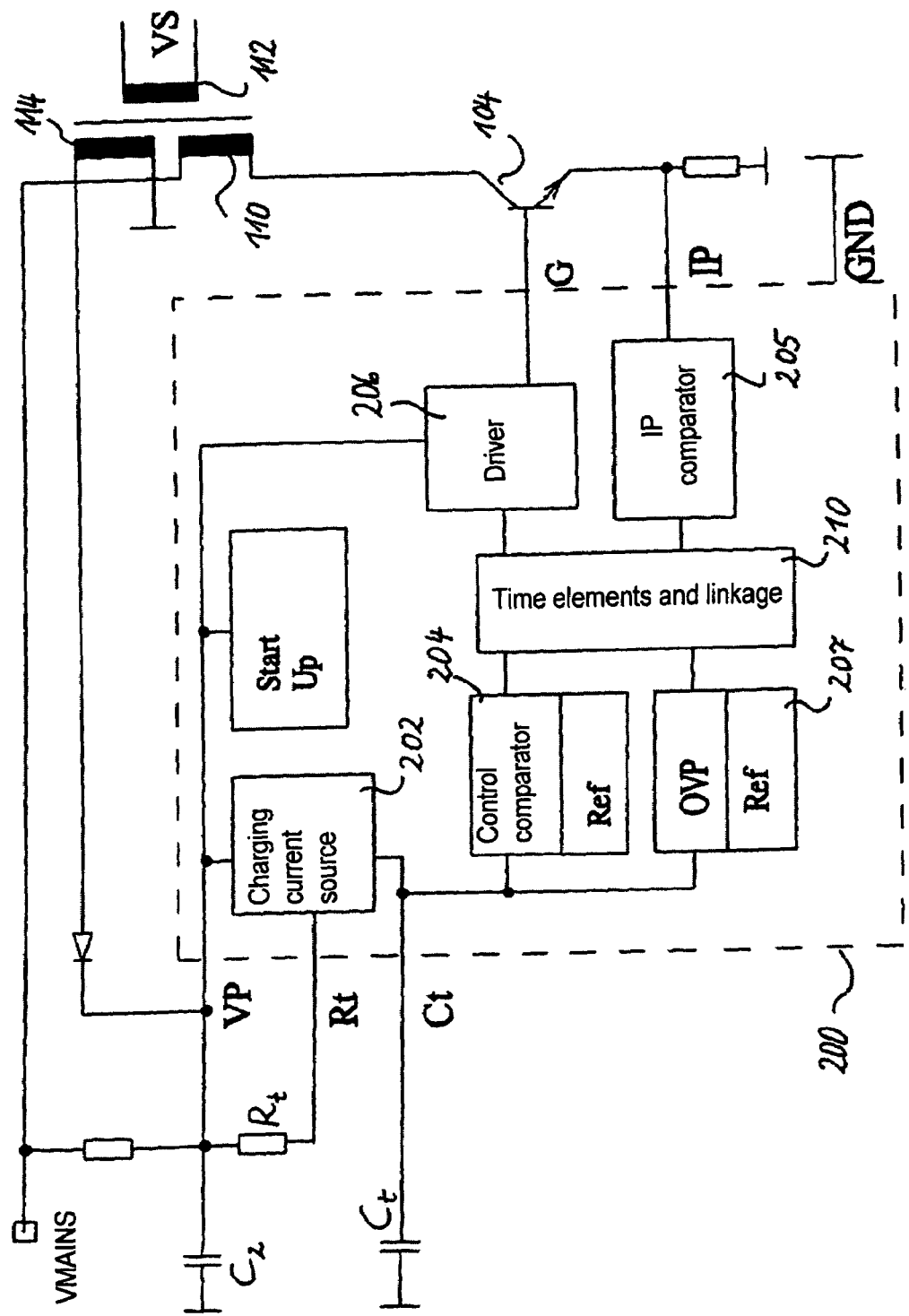
FIG. 2 shows a block diagram of a control circuit according to the present invention in its application environment.

FIG. 2 shows a control circuit 200 according to the present invention for controlling the output power of a primary-controlled switched-mode power supply unit in its application environment. Such a control circuit 200 can e.g. be implemented as an application-specific integrated circuit (ASIC). With the aid of the control circuit 200 the secondary power of the switched-mode power supply unit 100 which is supplied to the secondary winding 112 is adjusted to the desired value by controlling the electronic switch 104, here a power transistor, on the primary side. The voltage across the auxiliary winding 114 is used here as the control variable.

According to the invention the auxiliary voltage from the auxiliary winding 114 is fed to a charging current source 202. The charging current $I_{Ct}$ which this charging current source delivers serves to charge up the charging capacitor $C_t$. The charging current $I_{Ct}$ constitutes an image of the auxiliary voltage and thus an image of the output voltage. The voltage dropped across the charging capacitor $C_t$ is fed to a control comparator 204.

According to the present invention this control comparator 204 compares the voltage dropped across the charging capacitor $C_t$ with a first threshold value $V_{CtON}$. When this first threshold value is reached, the control comparator 204 sends a corresponding signal to the block "Time elements and linkage" 210, which, by appropriately triggering the driver 206, causes the switch 104 to be switched on. The driver might e.g. be a push-pull driver.

The control circuit 200 according to the invention also includes an overvoltage protection comparator (OVP comparator) 207, which is also subjected to the voltage at the charging capacitor $C_t$. If a second threshold value $V_{CtOVP}$ is exceeded, the OVP comparator 207 causes the switch 104 to be switched off, thus preventing the occurrence of overvoltages.

The control circuit 200 also includes an IP comparator 205, which measures the current IP which flows through the primary-side winding of the transformer 108 when the primary-side switch 104 is closed. To optimize the switch-off process of the primary-side switch 104, the current IP is e.g. compared with two threshold values in the IP comparator. When the current reaches the first threshold value the driver 206 is switched to high impedance. When the second threshold value is reached, the primary-side switch 104 is actively switched off. The difference between the two current thresholds determines the duration of the high impedance condition.

The functioning of the circuit of FIG. 2 will now be explained in more detail making reference to FIGS. 2, 3 and 4.

When the rising supply voltage at the connection VP has reached the so-called start-up voltage, the control circuit 200 is activated and starts to charge the capacitor $C_t$ by means of the charging current source 202. In FIG. 3 the curve 301 describes the way in which the voltage across the capacitor $C_t$ varies as a function of time. The curve 302 shows the associated driver signal at the connection G. The discharging of the capacitor $C_t$ can be characterized by the discharge time $T_{CtDIS}$. For example, for a capacitance of 100 pF the discharge time of the present circuit lies between 250 and 1000 ns.

Figure 3:
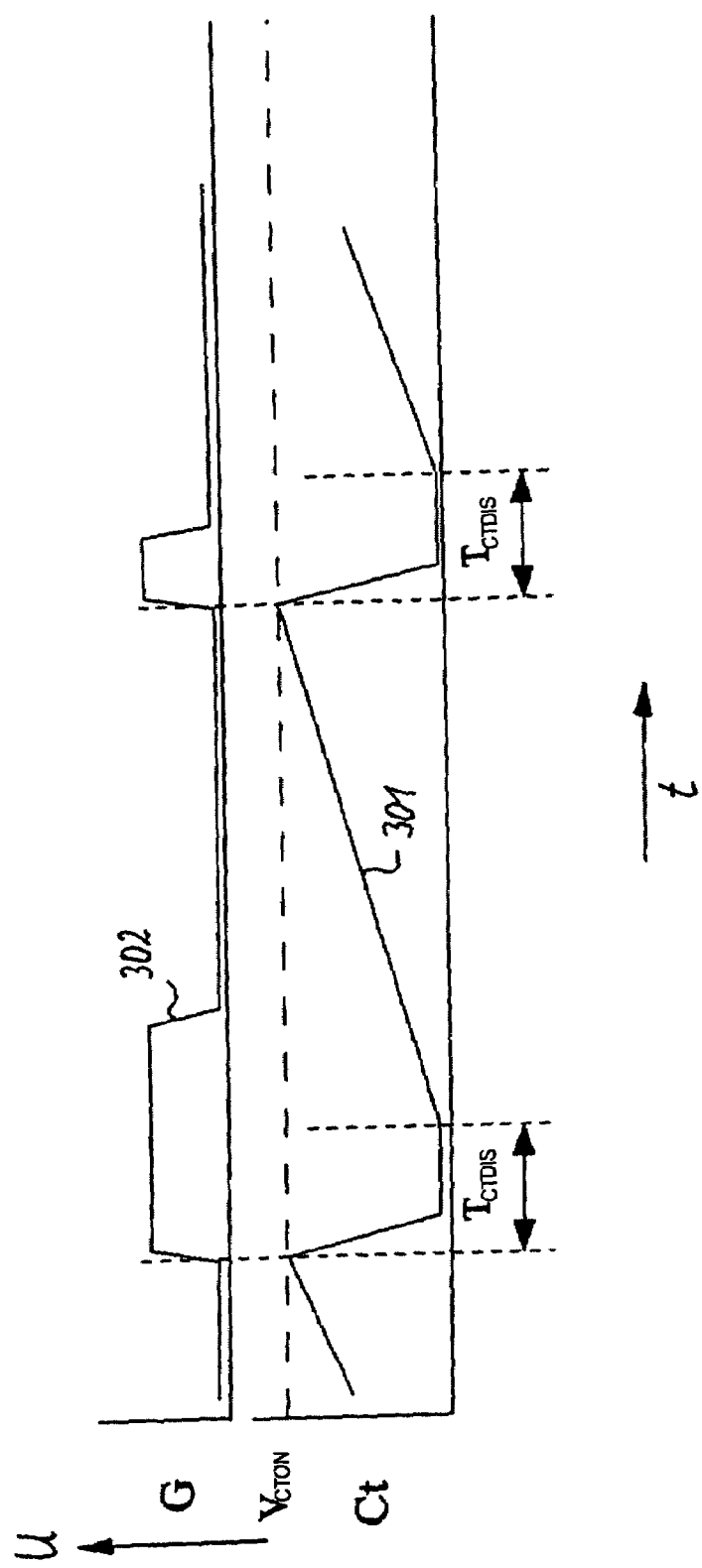
FIG. 3 shows a time diagram of the voltage profiles at the charging capacitor and at the driver output according to FIG. 2.
Figure 4:
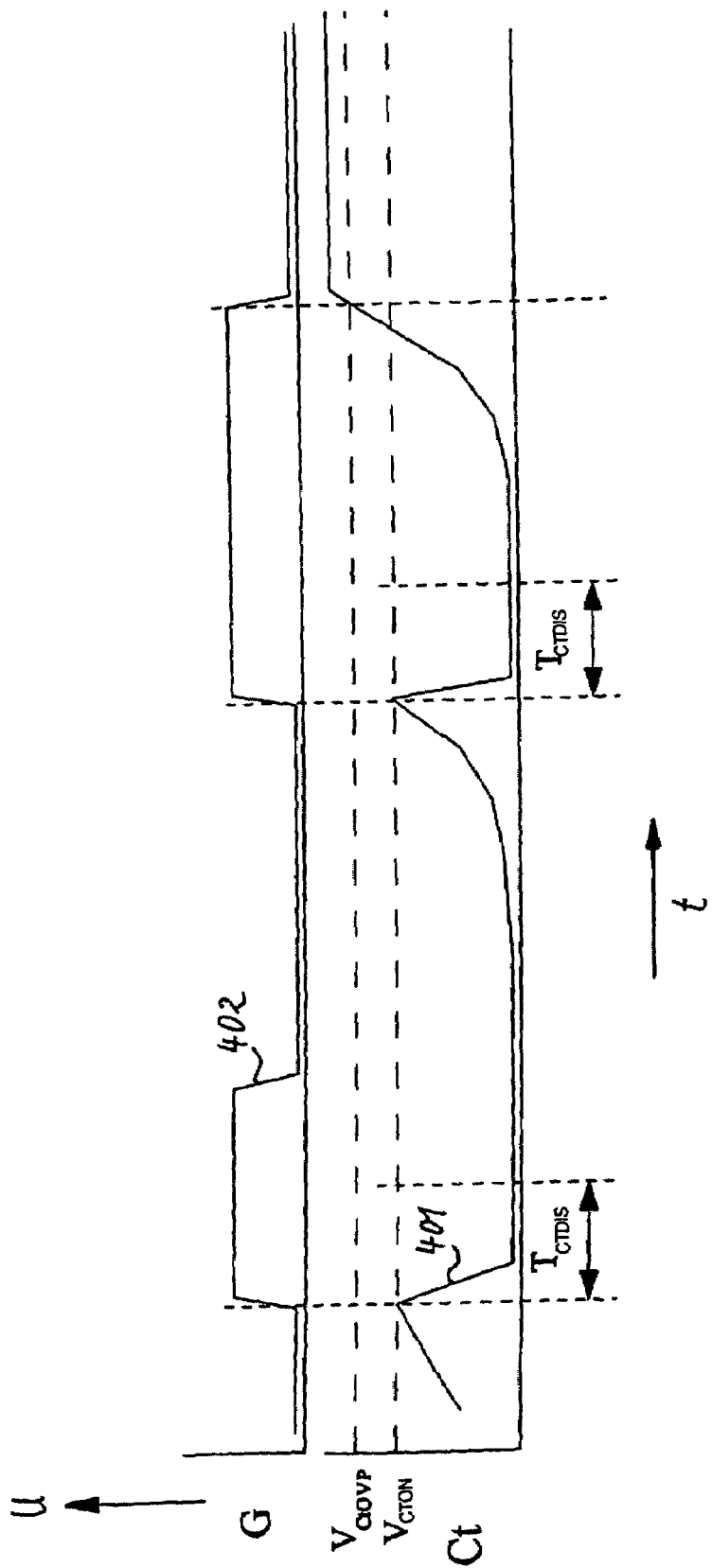
FIG. 4 shows the time profiles of the voltage at the charging capacitor and at the driver output to aid explanation of the overvoltage protection.

As can be seen from FIG. 3, the capacitor $C_t$ is charged up until the voltage dropped across it reaches the first threshold value $V_{CtON}$. Then the driver switches on. When the threshold $V_{IP}$, which determines the current through the primary coil of the transformer by means of an external resistor, is exceeded in the IP comparator 205, the driver is switched off again. The capacitor $C_t$ then starts to discharge. After a time $T_{CtDIS}$ has elapsed, the capacitor $C_t$ is charged up again. This sequence of events is repeated periodically until the switched-mode power supply unit is deactivated by a safety function or by being disconnected from the mains supply.

Apart from the components required for normal operation described above, safety circuits are provided to guard against unwanted operating conditions. For instance, the OVP comparator 207 responds to high voltages at the auxiliary winding, i.e. voltages exceeding the threshold $V_{CtOVP}$ (see FIG. 4), by switching the driver off and preventing it being switched on again.

Prior to the so-called start-up, power is supplied to the control circuit directly from the mains, in operation the circuit is supplied from the auxiliary winding 114.

The driver 206 contains a push-pull stage with VP as the supply voltage and it provides the control power for the external bipolar power transistor 104.

Figure 5:
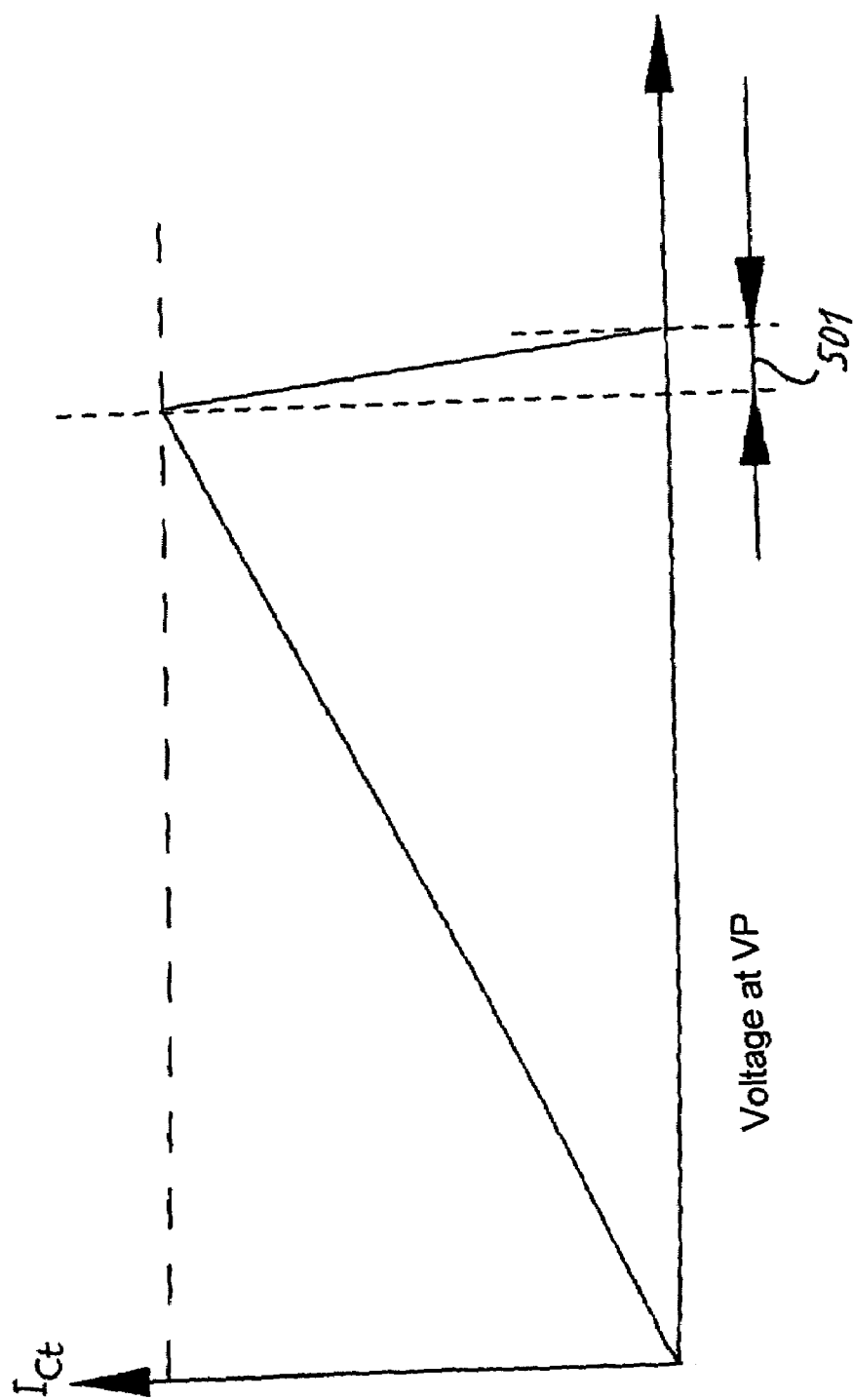
FIG. 5 shows a schematic representation of the relationship between the auxiliary voltage and the charging current of the charging capacitor.

FIG. 5 shows the variation in the charging current $I_{Ct}$ as a function of the voltage at the connection VP according to the present invention. The control as such is effected by transferring the secondary voltage to the auxiliary winding during the blocking phase and integrating this voltage in the capacitor $C_2$ connected to VP. The secondary output voltage is determined here by the turns ratio of secondary winding and auxiliary winding. As has already been stated, the pause duration is controlled so that the voltage at VP lies in the control zone 501. If the voltage lies below the control zone 501, the current is controlled such that the charging current at the capacitor $C_t$ is proportional to the voltage at VP. When the voltage at VP reaches the control zone 501, the charging current is reduced.

Figure 6:
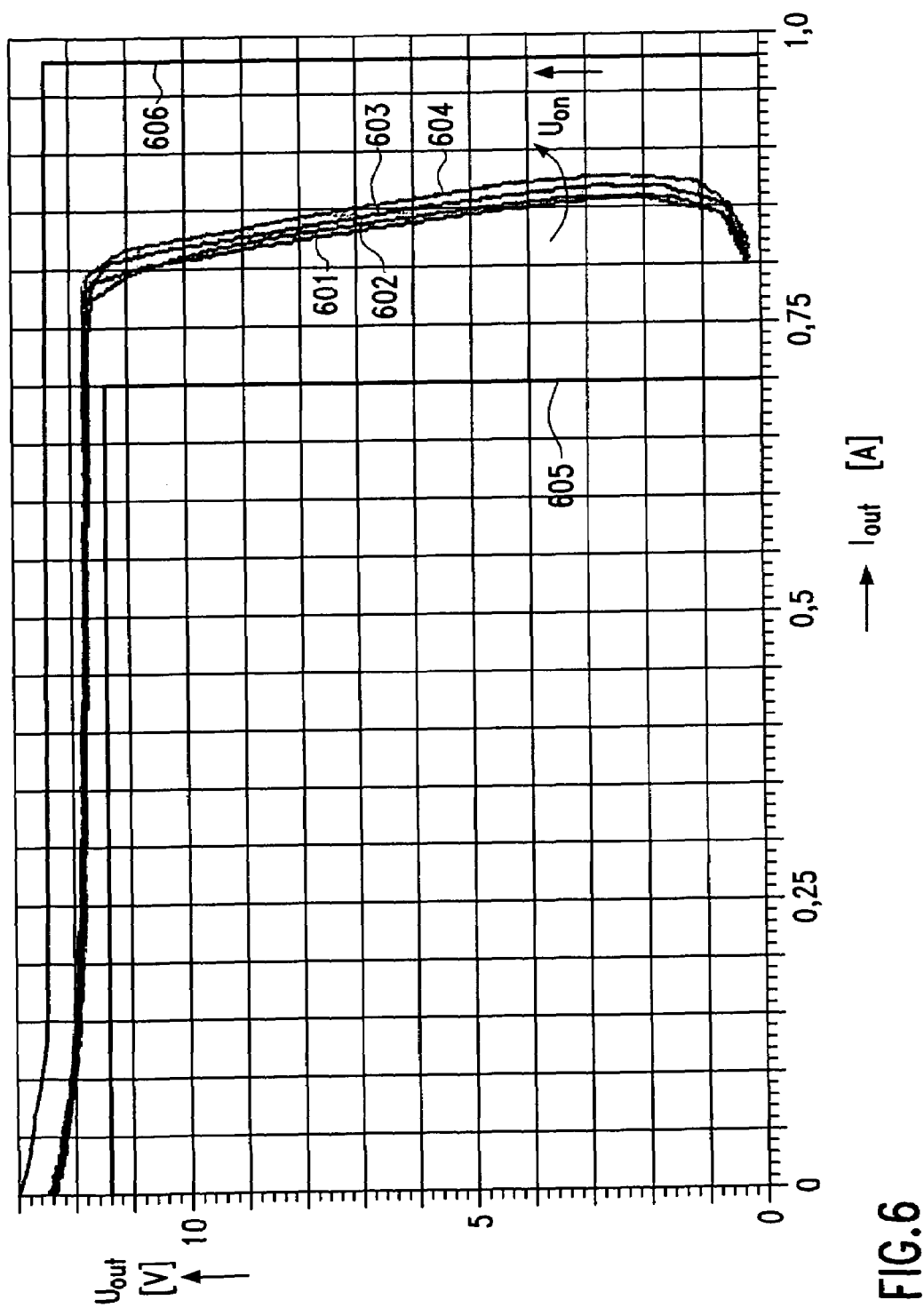
FIG. 6 shows a number of output characteristics of the switched-mode power supply unit according to FIG. 2.

In this way output characteristics such as those shown in FIG. 6 can e.g. be achieved with the switched-mode power supply unit according to the present invention. The curves 601, 602, 603 and 604 relate to input voltages of 90 V, 110 V, 230 V and 264 V ac. As can be seen from this representation, output characteristic profiles which reliably provide approximately constant current values $I_{out}$ for output voltages within the range 0 to 12 V can be obtained with the control circuit according to the present invention. This voltage range can, however, be adapted to meet any requirements by suitable choice of the number of turns of the primary-side winding 110 and the secondary-side winding 112.

The line 605 in FIG. 6 indicates the minimum permissible output voltage values and output current values and the curve 606 the maximum permissible values.

Although, for the sake of example, a linear relationship between the output voltage $U_{out}$ and the output current $I_{out}$ has been described in the foregoing, it is clear to the person skilled in the art that there is no restriction as to the output characteristic profiles which can be specified. All that is necessary is to adjust the profile of the curve in FIG. 5 accordingly.

According to an advantageous embodiment, the switching frequency is set in linear dependence on the auxiliary voltage in that the switching frequency of the primary-side switch is determined by the charging time of a charging capacitor. The charging capacitor can then e.g. be charged up to a predetermined voltage threshold with a current which is proportional to the auxiliary voltage. The charging time of the charging capacitor then determines the instant at which the switch is switched on. The advantage of this solution is that it can be implemented with very simple circuitry and very few components.

The charging current proportional to the auxiliary voltage is expediently provided by a controllable current source and is fed into the charging capacitor. To a first approximation, however, a charging current proportional to the auxiliary voltage can be achieved using a resistor. This is a particularly simple solution when the voltage threshold is small compared to the output voltage. For small output voltages the resulting frequency is then somewhat lower than it should be, leading to a diminished output current at low loads. Furthermore, since the efficiency η does not usually remain constant at low output voltages but decreases, this effect is magnified further. In most applications this effect poses no problem, however. It is, on the contrary, advantageous since the loading of the switched-mode power supply unit in the event of a short circuit is thereby minimized.

In addition, the charging current can be reduced when the voltage across the charging capacitor reaches a specified threshold value. In this way the profile of the output characteristic can be determined even in the operating state of the voltage control.

According to an advantageous further development, an overvoltage protection can be realized in a simple way in that the primary circuit is disconnected when the auxiliary voltage exceeds another, higher threshold value. This can last for a specified time or until reactivation, e.g. through interruption and reconnection of the mains voltage.

The advantageous properties of the control circuit according to the present invention are especially apparent in a primary-controlled switched-mode power supply unit.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention.

In addition, those areas in which it is believed that those ordinary skilled in the art are familiar have not been described herein in order to not unnecessarily obscure the invention described herein. Accordingly, it is to be understood that the invention is not to be limited by the specific illustrated embodiments, but only by the scope of the appended claims.

What is claimed is:

1. Method for controlling the output voltage of a primary-controlled switched-mode power supply unit having a primary-side switch and a transformer with an auxiliary winding in which an auxiliary voltage which images the output voltage is induced after the primary-side switch is opened, wherein the switching frequency of the primary-side switch is so adjusted in dependence on the auxiliary voltage that the output voltage and the output current of the switched-mode power supply unit take values which comply with a predetermined output characteristic, said output characteristic specifying a correlation between the output voltage and the output current, wherein the charging time of a charging capacitor, which is chargeable by means of a current source having a charging current that depends on the auxiliary voltage, determines the switching frequency of the primary-side switch by determining the instant when the primary switch is turned on.

2. Method according to claim 1, wherein the switching frequency of the primary-side switch is adjusted in linear dependence on the auxiliary voltage for at least some auxiliary voltage values, a constant factor of this linear dependence being so chosen that the output current adopts a predetermined constant value.

3. Method according to claim 1, wherein the charging current is reduced when the voltage across a second capacitor reaches a first limit value.

4. Method according to claim 3, wherein the primary-side switch is switched off when the voltage across the second capacitor reaches a second limit value.

5. Method according to claim 1, wherein the primary-side switch is switched on when the voltage across the charging capacitor reaches a first predetermined threshold value.

6. Switched-mode power supply unit with a control circuit for controlling the output voltage of a primary-controlled switched-mode power supply unit, said switched-mode power supply unit having a primary-side switch and a transformer with an auxiliary winding in which an auxiliary voltage is induced after the opening of the primary-side switch, said control circuit being designed for adjusting the switching frequency of the primary-side switch in linear dependence on the auxiliary voltage, a constant factor of this linear dependence being chosen in a way that the output current of the switched-mode power supply unit adopts a predetermined value, said output characteristic specifying a correlation between the output voltage and the output current, wherein the control circuit comprises a charging capacitor, which is chargeable by means of a current source having a charging current that depends on the auxiliary voltage, and wherein said charging capacitor is connected to the primary-side switch in a way that the voltage across the charging capacitor controls the switching frequency of the primary-side switch by determining the instant when the primary switch is turned on.

7. Switched-mode power supply unit according to claim 6, further comprising a control comparator for comparing the voltage across the charging capacitor with a first threshold value, said control comparator being designed for generating a switch-on signal for switching on the primary-side switch when the voltage across the charging capacitor reaches the first threshold value.

8. Switched-mode power supply unit according to claim 7, wherein the charging current source is designed in a way that the charging current is reduced when the voltage across the charging capacitor reaches the first threshold value.

9. Switched-mode power supply unit according to claim 6, further comprising an overvoltage protection circuit for comparing the voltage across the charging capacitor with a second threshold value that is designed for generating a switch-off signal for switching off the primary-side switch when the voltage across the charging capacitor reaches the second threshold value.

10. Control circuit for controlling the output voltage of a primary-controlled switched-mode power supply unit, said switched-mode power supply unit having a primary-side switch and a transformer with an auxiliary winding in which an auxiliary voltage is induced after the opening of the primary-side switch, said control circuit being designed for adjusting the switching frequency of the primary-side switch in linear dependence on the auxiliary voltage, a constant factor of this linear dependence being chosen in a way that the output voltage and the output current of the switched-mode power supply unit output values according to a predetermined output characteristic, said output characteristic specifying a correlation between the output voltage and the output current, wherein the control circuit comprises a charging capacitor, which is chargeable by means of a current source having a charging current that depends on the auxiliary voltage, and wherein said charging capacitor is connected to the primary-side switch in a way that the voltage across the charging capacitor controls the switching frequency of the primary-side switch by determining the instant when the primary switch is turned on.

11. Control circuit according to claim 10, further comprising a control comparator for comparing the voltage across the charging capacitor with a first threshold value, said control comparator being designed for generating a switch-on signal for switching on the primary-side switch when the voltage across the charging capacitor reaches the first threshold value.

12. Control circuit according to claim 10, wherein the charging current source is designed in a way that the charging current is reduced when the voltage across the charging capacitor reaches the first threshold value.

13. Control circuit according to claim 10, further comprising an overvoltage protection circuit for comparing the voltage across the charging capacitor with a second threshold value that is designed for generating a switch-off signal for switching off the primary-side switch when the voltage across the charging capacitor reaches the second threshold value.

\* \* \* \* \*